United States Patent [19]

Miyoshi

[11] 4,304,075
[45] Dec. 8, 1981

[54] MOLDING HOLDER FOR A WINDSHIELD OF A MOTOR VEHICLE

[75] Inventor: Masakazu Miyoshi, Yokohama, Japan

[73] Assignee: Kato Hatsujo Company Ltd., Yokohama, Japan

[21] Appl. No.: 56,250

[22] Filed: Jul. 10, 1979

[51] Int. Cl.³ .................... E04C 2/10; E04F 19/06
[52] U.S. Cl. ............................................ 52/98; 52/718
[58] Field of Search .................... 52/397–403, 52/716–718, 769, 98, 100

[56] References Cited

U.S. PATENT DOCUMENTS

| | | | |
|---|---|---|---|
| 2,606,635 | 8/1952 | Clingman | 52/716 |
| 3,338,007 | 8/1967 | Draplin | 52/403 |
| 3,524,290 | 8/1970 | Sarvay | 52/98 |
| 3,968,613 | 7/1976 | Meyer | 52/717 |
| 4,110,942 | 9/1978 | Slocomb | 52/100 |

FOREIGN PATENT DOCUMENTS 1252603 12/1960 France .................... 52/403

*Primary Examiner*—James L. Ridgill, Jr.
*Attorney, Agent, or Firm*—Koda and Androlia

[57] ABSTRACT

A molding holder for a motor vehicle windshield which is formed in one piece from a plastic material and includes a fixed base to be coupled to a body panel of the motor vehicle, a clasp that extends from one edge of the fixed base and is formed substantially parallel to the fixed base, a thin base that extends from another edge of and is thinner than the fixed base and a molding connector formed between the inner surface of the clasp member and the fixed base whereby the molding is held and fastened by locking an edge of the molding into the molding connector by inserting the molding under pressure between the fixed base and the clasp member.

4 Claims, 10 Drawing Figures

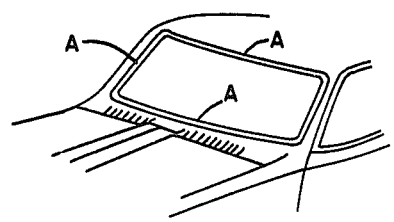
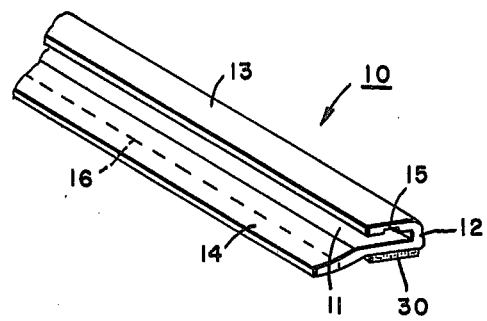
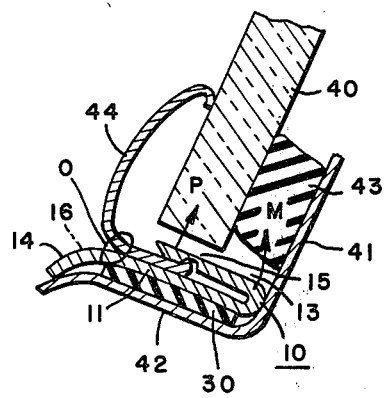
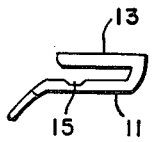
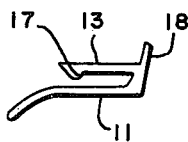
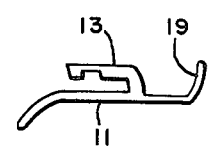

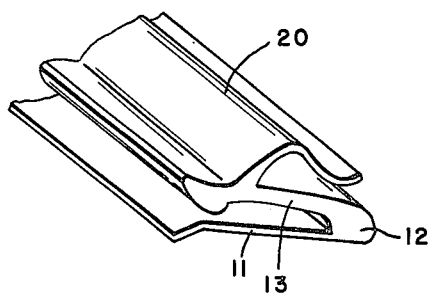
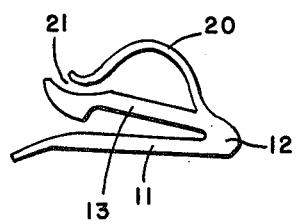
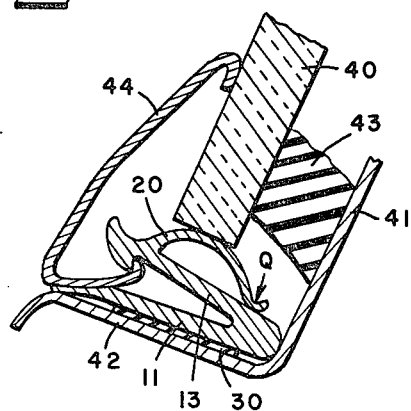
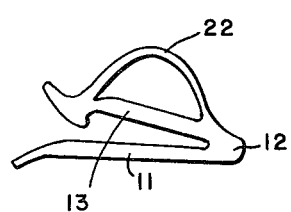

MOLDING HOLDER FOR A WINDSHIELD OF A MOTOR VEHICLE

BACKGROUND OF THE INVENTION

1. Field of Invention

This invention relates to means for installing automobile windshields and more particularly to means for holding the ornamental molding which is used as a decoration on the periphery of an automobile windshield.

2. Prior Art

Windshield molding is installed on the periphery of an automobile windshield not only for decoration, but also for waterproofing and dust proofing. Regarding the installation of such molding, conventionally a leaf spring-bearing fastener is anchored to a part of the body, and the molding is anchored by locking it to the tip of the fastener. Such conventional molding installation is described in U.S. Pat. No. 3,155,422. Also in U.S. Pat. No. 3,673,300 is disclosed a means for installing the windshield molding. In this patent T studs are welded to the body at fixed intervals and the molding is installed using fasteners (e.g. the metallic fasteners described in U.S. Pat. No. 3,670,368 or the plastic fasteners described in U.S. Pat. No. 3,555,629). These fasteners have keyhole slots and the fasteners are anchored by inserting and sliding the heads of the T studs into these T hole slots. After this anchoring, the molding is installed by connecting the edge of the molding to the fasteners.

However, in the above described processes not only are the T studs bent by welding and the weld height and spacing irregular, but much time and trouble are required and the process is not suitable for mass production. Moreover, sputter adheres to the welded part during T stud welding and it is therefore difficult for paint to adhere to these places and rust develops in region of the weld and around the metallic fasteners. Accordingly, a decreased market value frequently results due to the development of rust when the vehicle is in the hands of a purchaser.

SUMMARY OF THE INVENTION

Accordingly, the general object of the present invention is to obviate the difficulties of the prior art. In particular, it is an object of the present invention to devise a windshield molding holder that decreases sharply the number of assembly steps required as well as preventing rust by eliminating metallic studs.

It is another object of the present invention to provide a motor vehicle with a continued high market value.

In keeping with the principles of the present invention, the objects are accomplished by a unique molding holder for motor vehicle windshields which is formed in one piece from plastic material. The molding holder includes a fixed base to be coupled to a body panel of the motor vehicle, a clasp member that extends from one edge of the fixed base and is formed substantially parallel to the fixed base, a base that extends from the other edge of and is thinner than the fixed base and a molding connector formed between the inner surface of the clasp and the fixed base whereby the molding is held and fastened by locking an edge of the molding into the molding connector by inserting it with pressure between the fixed base and clasp.

BRIEF DESCRIPTION OF THE DRAWINGS

The above mentioned features and objects of the present invention will become more apparent with reference to the following description taken in conjunction with the accompanying drawings wherein like reference numerals denote like elements and in which:

FIG. 1 is an oblique view of the front of a motor vehicle showing the position for the installation of the molding holder of the present invention;

FIG. 2 is an oblique view of the molding holder of the present invention;

FIG. 3 is a cross section of the molding holder of the present invention;

FIGS. 4A, 4B and 4C are side views illustrating second, third and fourth embodiments of a molding holder of the present invention;

FIG. 5A is an oblique view of a fifth embodiment of a molding holder in accordance with the teachings of the present invention and FIG. 5B is a side view of the fifth embodiment of a molding holder in accordance with the teachings of the present invention;

FIG. 6 is a cross section of the fifth embodiment of the molding holder in accordance with the teachings of the present invention; and FIG. 7 is sixth embodiment of a molding holder in accordance with the teachings of the present invention.

DETAILED DESCRIPTION OF THE INVENTION

Referring more particularly to the drawings, shown in FIG. 1 is an oblique view of the front of an automobile showing the installed configuration of a molding held in accordance with the teachings of the present invention. The installation positions are indicated by the letter A. FIG. 2 is an oblique view of molding holder in accordance with the teachings of the present invention. In FIG. 2, the molding holder 10 is formed in one piece from a plastic material. The molding holder 10 includes a fixed base portion 11 which is bonded to a body panel of the motor vehicle, a clasp portion 13 connected to an edge of the fixed base 11 at a connector portion 12, a base front flap portion 14 that is formed at the edge of the fixed base 11 and which is thinner than the base 11 and extends lengthwise and a notch 15 that is formed lengthwise in the inner surface of the clasp 13. Double-sided tape 30 is bonded to the entire length of the bottom surface of the fixed base 11 but it is not essential to provide an adhesive on the bottom surface of the base 11 because the base 11 is formed into a curved surface that conforms closely to the body panel.

Since the notch 15 anchors the molding by being coupled to the edge of the molding, the position of notch 15 may be freely determined and the shape of the notch 15 is set to correspond to the shape of the edge of the molding.

Cutting line 16 is formed lengthwise in almost the middle of the base front flap portion 14. The cutting line 16 is made from perforations provided in the molding holder 10 and the perforations may be made mechanically following extrusion or the molding holder 10 may be formed in one piece using a two color mold and the position of the cutting line 16 is the division between the two colors. When this two color molding is used, different materials are used and oppose each other along the cutting line 16 so that a kind of dividing line is formed and it is easy to separate.

In the following paragraphs, the method of using the molding holder 10 will be explained with reference to FIG. 3.

The adhesive portion of one side of the double-sided tape 30 is bonded to the fixed base 11 of the molding holder 10. The molding holder 10 is cut to almost the same width and height as the windshield 40. Next, the silicon coated paper which is stuck to the other surface of the double-sided tape 30 is peeled off and the molding holder is bonded widthwise and lengthwise along the ledge portion 42 of the body panel 41. In this case, the molding holder 10 can be bonded very well to the body panel 41 if notches are made in appropriate places in the holder 10 according to the shape of the body panel surface 41. After the molding holder 10 has been completely bonded to all four sides of the ledge portion 42 around the windshield, the windshield 40 having an adhesive material 43 on its edge is pressure bonded to the body panel 41.

Next, the lower edge of the molding 44 is pressure inserted in the clasp 13 and the fixed base 11 of the molding holder 10. When the lower edge of the molding 44 is pressure inserted between the clasp 13 and the fixed base 11, the projection on the edge of the molding 44 fits into the notch 15 and the molding 44 is anchored. Simultaneously, the upper part of the molding 44 is bent inwardly due to its elasticity and adheres closely to the windshield 40 due to this pressure. In this way, the molding is securely installed by merely fastening its lower part into the molding holder 10 and simultaneously utilizing the counterforce. Also, because the molding holder 10 is held against the body panel by the molding 44, the double sided tape 30 does not come off. Moreover, assembly is simple because the molding 44 is installed by merely pressing it into the molding holder 10.

Next, half of the base flap 14 is removed when the edge portion is pulled off along the cutting line 16 on the base flap 14. The base flap 14 is necessary for preventing scratches on the body panel 41 when the molding 44 is installed, but market value considerations make it desirable that it not stick out too much. A superior external appearance results when the base flap 14 is trimmed along the cutting line 16 as described above.

FIGS. 4A, 4B and 4C are side views of second, third and fourth embodiments of a molding holder 10 in accordance with the teachings of the present invention. In the first embodiment a notch 15 is formed in the inner surface of the clasp 13 as a molding holding means but, the effect is identical if it is formed similarly on the inner surface of the fixed base 11 as is shown in FIG. 4A. Also, if a projection 17 is formed on the edge of the clasp 13 as in FIG. 4B, the results are the same. In addition, when a rising part 18 is formed in the clasp 13 as shown in FIG. 4B, the upper surfaces of the clasp 13 and the rising part 18 are exposed to the adhesive 43. As a result, the molding holder 10 is fixed more securely to the body panel 41 by means of the adhesive 43. To take better use of the adhesive 43, the back edge of the fixed base 11 can be extended as shown in FIG. 4C and a rising part 19 formed which more easily extends into the adhesive 43.

Referring to FIG. 5, showing there is a fifth embodiment of a molding holder 10 in accordance with the teachings of the present invention. FIG. 5A is an oblique view while FIG. 5B is a side view. Shown in FIG. 6 is an assembled cross section of a fifth embodiment of a molding holder in accordance with the teachings of the present invention. In the case described above for the molding holder 10 shown in FIGS. 2 and 3 when the molding 44 is assembled, force P in the clasp 13 acts in the direction of the edge surface of the glass. On the other hand, the front edge (i.e. the region O that contacts the lower curve of the molding 44) of the molding holder 10 is presssed against the motor vehicle body by the molding 44 so that a force in the direction of the arrow M acts on the molding holder 10 with the region O as the fulcrum. Since the double sided tape 30 is caused to readily peel off due to this force in the direction of arrow M, the molding holder 10 comes off the body due to this force in the direction M during the installation of the molding 44.

The molding holder shown in FIGS. 5 and 6 rectifies the above described defect. That is, a curved leaf spring 20 that is depressed by the lower edge surface of the windshield 40 is formed in the upper surface of the clasp 13. As a result the molding holder 10 has a slight gap 21 between the leaf spring 20 and the clasp 13. It should be apparent that this fifth embodiment is assembled in exactly the same manner as the other embodiments; however, during installation of the molding 44, the clasp 13 moves towards the surface of the glass 40 so that the leaf spring 20 contacts the edge of the glass 40. Moreover, because the leaf spring 20 affects the upper surface of the clasp 13, the bottom of the fixed base 11 receives a force Q through the clasp 13 in the direction of the motor vehicle body and the molding holder 10 is prevented from peeling off the car body.

Furthermore, the larger the amount of movement of the clasp 13 in the direction of the edge of the glass 40 during installation of the molding 44, the larger the force Q acting on the fixed base 11. Therefore, the separation of the molding holder 10 from the body panel windshield opening ledge 42 is prevented.

Referring to FIG. 7, shown therein is a sixth embodiment of a molding holder in accordance with the teachings of the present invention. In FIG. 7 is shown a molding holder with a leaf spring 22 having a curved portion that extends on top of the clasp 13 from its front to its back. In this configuration, the molding holder demonstrates the same effect as that shown in FIG. 5.

From the above description it is evident that since the molding holder of the present invention is fastened to the body panel using adhesive tape, there is no problem of corrosion. Also, because external forces that peel off the adhesive tape are eliminated, the holder can be securely fixed to the motor vehicle. Moreover, since there are no metal studs to weld, the number of assembly operations is decreased and a very sound molding holder is obtained.

It should be apparent to those skilled in the art that the above described embodiments are merely illustrative of but a few of the many possible specific embodiments which represent the applications of the principles to the present invention. Numerous and varied other arrangements can be readily devised by those skilled in the art without departing from the spirit and scope of the invention.

I claim:
1. A molding holder for a motor vehicle windshield that is extruded in one piece from a plastic material and having a cross section which comprises:
   a fixed base portion having a bottom surface adapted to be conformingly adhered to a windshield opening ledge formed in a body panel of said motor vehicle;

a clasp portion that extends from one edge of said fixed base portion and is formed substantially parallel to said fixed base portion;

a base front flap portion that extends from the other edge of and is thinner than said fixed base portion and that serves to protect said body panel from scratches during the installation of the windshield ornamental molding;

a molding holding means formed between said clasp portion and said fixed base portion whereby said molding may be held and fastened by anchoring a first edge of said molding into said molding holder by pressing said first edge of said molding between said fixed base portion and said clasp portion; and molding holder dividing line means for facillitating the separation of the undesired edge portion of said base front flap portion sticking out from under said molding from the remainder of said molding holder after said molding has been held and fastened by said molding holding means.

2. A molding holder according to claim 1 further comprising a curved leaf spring integrally formed on an upper surface of said clasp portion, said curved leaf spring being adapted to engage with and to be depressed by a bottom surface of said windshield and to thereby apply a force tending to retain said fixed base portion in its operative position in conforming engagement with said body panel windshield opening ledge.

3. The molding holder of claim 1 wherein said molding holder dividing line means comprises a series of mechanical perforations located lengthwise at about the middle of said base front flap portion.

4. The molding holder of claim 3 wherein said molding holder dividing line means comprises the division between materials formed using a two-color mold for the extrusion of said molding holder.

* * * * *